Sept. 29, 1970   D. R. MERCER   3,531,023
PROCESS AND APPARATUS FOR MELTING AND DISPENSING
THERMOPLASTIC MATERIAL
Filed April 30, 1968   3 Sheets-Sheet 1

INVENTOR:
DONALD R. MERCER
BY
Harrington A. Lockey
ATTORNEY

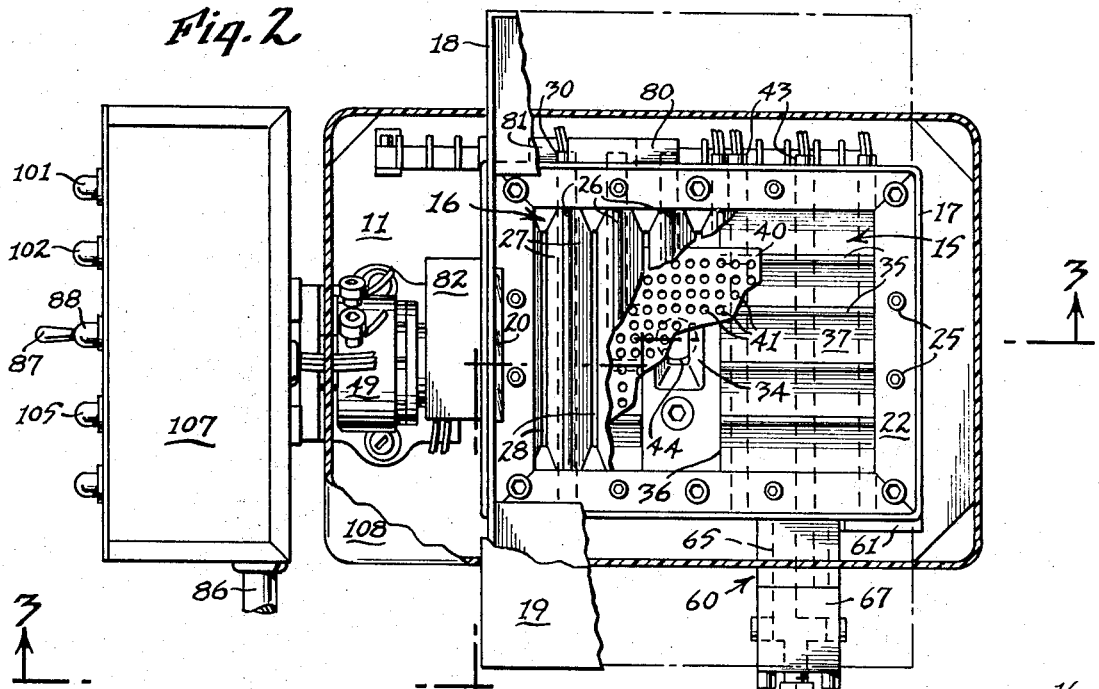
Fig. 2
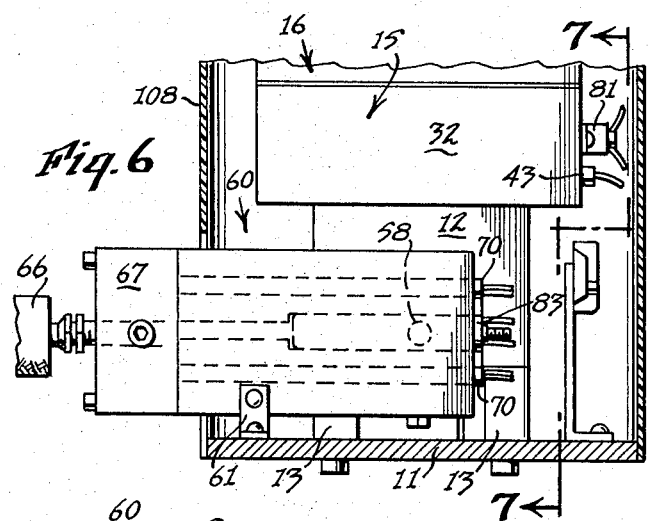
Fig. 6
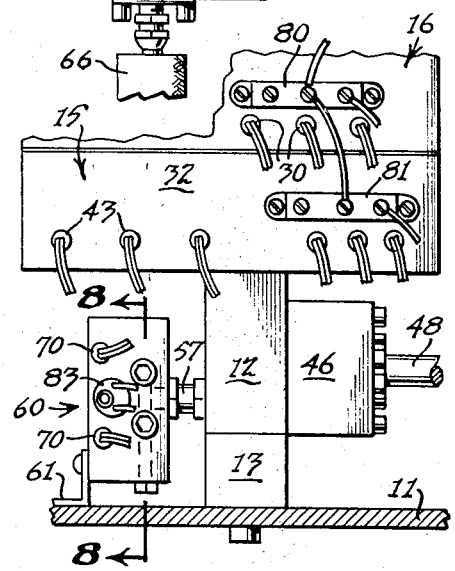
Fig. 7
Fig. 8
INVENTOR:
DONALD R. MERCER
BY
Harrington A. Lackey
ATTORNEY

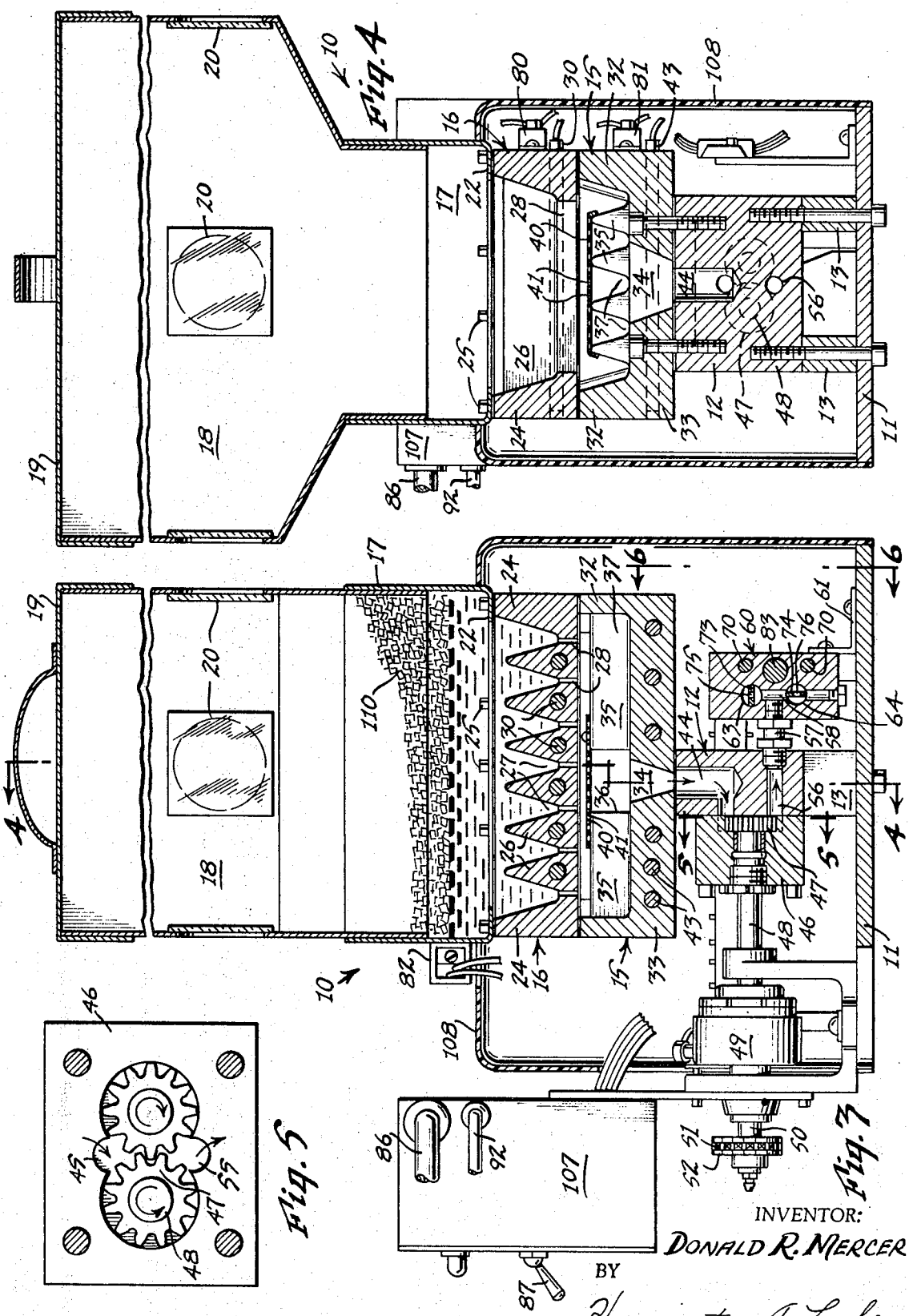

United States Patent Office 3,531,023
Patented Sept. 29, 1970

3,531,023
PROCESS AND APPARATUS FOR MELTING AND DISPENSING THERMOPLASTIC MATERIAL
Donald R. Mercer, Hendersonville, Tenn., assignor to Mercer Corporation, Hendersonville, Tenn., a corporation of Tennessee
Filed Apr. 30, 1968, Ser. No. 725,451
Int. Cl. B67d 5/62
U.S. Cl. 222—146  12 Claims

ABSTRACT OF THE DISCLOSURE

An apparatus for melting and dispensing thermoplastic material having a melting receptacle, a dispensing head and a pump, the bottom wall of the receptacle having a heated, undulated surface for quickly melting the thermoplastic material, and a pre-melt chamber above the melting receptacle for carrying a sufficient quantity of solid thermoplastic material to completely cover the melted material.

BACKGROUND OF THE INVENTION

This invention relates to an apparatus for melting and dispensing thermoplastic material, and more particularly to an apparatus for melting and dispensing thermoplastic adhesive material rapidly and efficiently.

The conventional apparatus for melting hot-melt adhesives is a pot or tank having closed or continuous side walls and a bottom wall with a substantially smooth interior surface and thermal elements for heating the walls so that the interior wall surfaces melt the thermoplastic adhesive material. Usually, the entire charge of thermoplastic material required for a specific job is dumped into the pot, and the thermal elements are energized to heat the pot walls until the entire charge of adhesive material is completely melted. The adhesive material is then withdrawn in fluid form through a dispensing or applicator head and applied to the desired work surfaces. Since most jobs require a substantial charge volume, considerable warm-up time is incurred in changing the state of the entire charge from solid to liquid. Since only a small proportion of the charge is in actual contact with, or even adjacent to, the heated wall surfaces, there is a considerable variation in temperature throughout the charge mass.

Furthermore, most thermoplastic materials, such as polyethylene, will oxidize, and even char, when heated for any length of time upon exposure to the atmosphere. Since the tops of the heated pots are generally open, charring occurs on the upper surface of the molten thermoplastic material.

Furthermore, such heated pots are quite inefficient, particularly where operation times are short or intermittent, because of the long warm-up periods required each time the melting process is started.

SUMMARY OF THE INVENTION

It is therefore an object of this invention to overcome the above disadvantages by providing an apparatus for melting and dispensing thermoplastic materials including a melting receptacle having highly thermal-conductive continuous side walls and a bottom wall. The bottom wall is provided with a heated undulated surface so that the thermoplastic material is exposed to a substantially greater heated surface area than if the bottom wall were flat, or smooth, such as exist in conventional heated pots. Furthermore, the undulated heated surface is preferably in the form of ribs which project upwardly to occupy a substantial portion of the space within the melting receptacle. Thus, not only is the thermoplastic material exposed to a large heated surface, but also much smaller amounts of the thermoplastic material occupy the spaces in the melting receptacle between the ribs.

The side walls of the melting receptacle are effectively projected upwardly in the form of a hopper or pre-melt chamber to a sufficient height to permit the melted material to be entirely covered by the solid pre-melted material, to prevent oxidation of the melted material by exposure to the atmosphere.

The melted material is discharged through a bottom opening, and then through a positively driven gear pump, which is adapted to accommodate the hot fluid material with a minimum of maintenance. The molten material is then pumped to a dispensing head including a plurality of small dispensing passages, the walls of which are heated in order to adequately maintain the thermoplastic material in the dispensing head in molten condition at all times while the apparatus is in operation, and to afford minimum re-melting, or warm-up, time after periods of non-use.

The invention also contemplates the insertion of one or more intermediate melting chambers between the melting receptacle and the hopper. These intermediate chambers are provided with a plurality of spaced, vertically disposed, heated partitions, or additional undulating surfaces, in order to provide additional reservoirs of molten plastic for jobs requiring higher rates of fluid plastic application.

Another object of this invention is to provide thermostatic controls for maintaining the fluid thermoplastic at the various stages of operation at the optimum temperature for the most efficient use, and for maintaining a solid thermoplastic cover over the upper surfaces of the molten thermoplastic material.

Another object of this invention is to provide an apparatus in which high dispensing temperatures may be attained in the dispensing head without a corresponding increase of heat in the shaft packing of the pump.

A further object of this invention is to provide a positive type displacement pump which will handle molten materials having a wide range of viscosities.

Another object of this invention is to provide an apparatus for melting and dispensing thermoplastic materials which can be made substantially smaller in size, with much less material, and more economically than the conventional heated pots and tanks now used for the melting and dispensing of thermoplastic materials.

BRIEF DESCRIPTION OF THE DRAWINGS

FIG. 2 is a top plan view of the apparatus disclosed in FIG. 1, with parts broken away at different elevations to better disclose the construction of the invention;
FIG. 3 is a section taken along the line 3—3 of FIG. 2;
FIG. 4 is a section taken along the line 4—4 of FIG. 3;
FIG. 5 is a section taken along the line 5—5 of FIG. 3;
FIG. 6 is a section taken along the line 6—6 of FIG. 3;
FIG. 7 is a section taken along the line 7—7 of FIG. 6;
FIG. 8 is a section taken along the line 8—8 of FIG. 7;
and
FIG. 9 is a schematic diagram of the electrical control circuit employed in the operation of the apparatus.

DESCRIPTION OF THE PREFERRED EMBODIMENT

Figure 1:
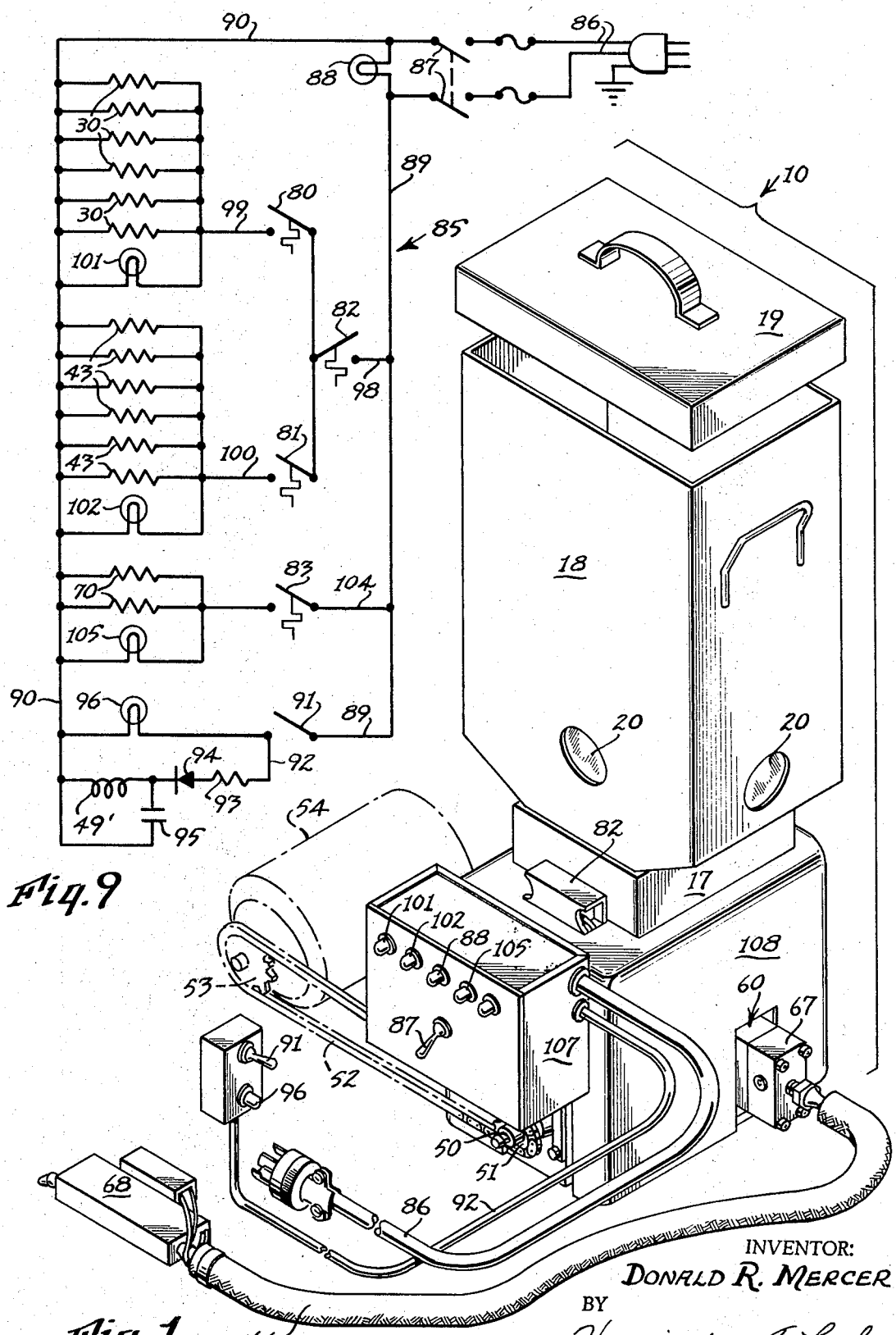
FIG. 1 is a perspective view of an apparatus made in accordance with this invention.

Referring now to the drawings in more detail, the apparatus 10 has a base or base plate 11 above which is supported a conduit block 12 upon spacer blocks 13. Fixed on top of the conduit block 12 is the melting receptacle 15. Supported on top of the melting receptacle 15 and in verticle alignment therewith may be one or more intermediate melting chambers 16, one of which is illustrated in the drawings. Mounted on top of the intermediate chamber 16, or upon the top of melting receptacle 15 if no intermediate chambers are employed, is a pre-melt chamber or hopper 17. Mounted above and seated within the hopper 17 is an enclosed hopper extension or supply chamber 18 adapted to receive a quantity of thermoplastic material, such as polyethylene, in solid form, preferably small solid particles or pellets. The supply chamber 18 may be provided with a top or lid 19, if desired. Moreover, the bottom portion of the supply chamber 18 may be provided with sight openings 20 covered by transparent material, such as "Plexiglas," to indicate a low level of the material and the need for refilling.

The pre-melt chamber or hopper 17 is disclosed as having a continous side wall or walls in a rectangular cross-section with an open top for telescopingly receiving the bottom open spout of the supply chamber 18, and an open bottom. The bottom edges of the side walls of the hopper 17 may be in-turned to form a flange 22 for securing the hopper 17 to the top of the side and end walls 24 of the intermediate melting chamber 16, if desired, by bolts 25.

The side and end walls 24 of the intermediate melting chamber 16 also are in a rectangular form of substantially the same size and shape as the rectangular hopper 17. However, the side and end walls 24 are much thicker than the walls of the hopper 17 and are made of a highly heat-conductive material, such as aluminum, whereas the thermal conductivity of the walls of the hopper 17 are relatively immaterial. Spaced longitudinally of the intermediate chamber 16 are a plurality of transversely disposed, upwardly projecting, partition walls 26, extending from the bottom surface to almost the full height of the intermediate chamber 16. The opposite side surfaces of each partition wall 26 preferably converge upwardly, so that each partition wall 26 preferably converge upwardly, so that each partition wall 26 has a substantially triangular cross-section to provide substantially V-shaped material recesses or pockets 27 between each pair of partition walls 26. The inner surface of each of the end walls 24 also slope upwardly and outwardly to form a substantially V-shaped recess 27 between each end wall 24 and the adjacent transverse partition wall 25. In the bottom of each V-shaped recess 27 is an elongated, transversely disposed, vertically extending fluid passage 28. The V-shaped recesses 27 permit the smaller quantities of the thermoplastic material in the bottom of each recess 27 to melt first and cause the melting to progress upwardly through wider levels of material. In this manner, flow through passages 28 is expedited.

Extending transversely of the intermediate chamber 16, coextensively within each partition wall 26 is an elongated heating element or rod 30. The partition walls 26 are also formed of highly thermal-conductive material, and may be, and preferably are, of the same material as the side and end walls 24 of the intermediate chamber 16. As a matter of fact, the side and end walls 24 and the partition walls 26 of the intermediate chamber 16 disclosed in the drawings are integrally formed in a cast block of aluminum metal.

The intermediate melting chamber 16 is fixed upon and in vertical alignment with the melting receptacle 15. The side and end walls 32 of the melting receptacle 15 are continous and have a rectangular horizontal cross-section, preferably of the same size as the intermediate melting chamber 16. The melting receptacle 15 also is provided with a bottom wall 33, but has an open top so that the fluid passages 28 provide fluid commnunication between the recesses 27 of the intermediate chamber 16 and the interior of the melting receptacle 15. Formed transversely, approximately across the middle, but extending through the bottom wall 33 of the melting receptacle 15 is a discharge opening 34.

The upper surface of the bottom wall 33 of the melting receptacle 15 is undulated to provide a much greater heating surface for the thermoplastic material, than if the upper surface of the bottom wall were flat and horizontal. The undulating upper surface of the bottom wall 33 is specifically disclosed in the drawings as a plurality of longitudinally extending, transversely spaced, and upwardly projecting ribs 35. These ribs 35 extend substantially the length of the melting receptacle 15, except that the middle portions of each are removed to provide a series of transversely aligned fluid passages 36 immediately above the transversely extending discharge opening 34. These transverse passages 36 provide continous uninterrupted fluid communication for the melted thermoplastic material in any of the recesses 37 formed between any pair of adjacent ribs 35 or between a side wall 32 and an adjacent rib 35, with the discharge opening 34.

The side and end walls 32 of the melting receptacle 15 also have downwardly and inwardly sloping inner surfaces similar to the walls 24 of the intermediate chamber 16. Furthermore, the ribs 35 are preferably formed with opposite sloping sides and cross-sections similar to the partition walls 26 in the intermediate chamber 16 in order to expedite molten flow to the discharge opening 34. The ribs 35 also project upwardly almost the full height of the side and end walls 32.

A reticulated shield 40 having perforations 41 is mounted on top of the ribs 35 to span the fluid passages 36. In this manner, the perforations 41 will permit melted thermoplastic material of a low viscosity to pass directly through the perforations 41, passages 36 and discharge opening 34. Thermoplastic material of higher viscosity will not be able to penetrate the shield 40, and will remain on top of the shield 40 until sufficiently heated to lower the viscosity until it can penetrate the shield 40.

The melting receptacle 15 is heated by elongated thermal elements or rods 43 extending transversely through, and embedded in, the bottom wall 33. These rods 43 are practically identical to the thermal rods 30 in the intermediate chamber 16.

The discharge opening 34 communicates with an inlet conduit or bore 44 in the conduit block 12. The inlet conduit 44 in turn communicates with the inlet port 45 of a pump chamber or housing 46, fixed to the conduit block 12. The pump chamber 46 houses a rotary gear pump 47 propelled by pump shaft 48 connected through a magnetic clutch 49 to a driven shaft 50, which is driven through sprocket 51, chain 52, drive sprocket 53 and motor 54, as best disclosed in FIGS. 1 and 3. The driven shaft 50, may of course, be driven by any other convenient power drive, such as an existing drive shaft on packaging or plastic machinery in conjunction with which the apparatus 10 will operate.

The outlet port 55 of the pump chamber 46 communicates with outlet conduit 56 in conduit block 12. The outlet conduit 56 in turn is connected in fluid communication through another conduit or fluid coupling 57 to the inlet port 58 of the dispensing head 60.

The dispensing head 60 is also preferably a solid block of a highly thermal-conductive material, such as aluminum, and is mounted upon the base plate 11 by the bracket 61. The inlet port 58 opens into a pair of fluid passages or bores 63 and 64 which are elongated and extend parallel to each other longitudinally of the dispensing head 60. The opposite, or discharge, ends of the bores 63 and 64 both communicate with the discharge passage or bore 65, which in turn effects fluid communication with a discharge hose 66 through discharge fitting 67. The discharge hose 66 may be of a conventional type, which is heated, and provided with a heated discharge or nozzle head 68, as best disclosed in FIG. 1.

Adapted to heat the dispensing head 60 are a pair of elongated thermal heating elements or rods 70 extending longitudinally through the highly thermal-conductive material of the dispensing head 60.

Thus, by dividing the passage of the melted thermoplastic material through the two parallel fluid passages 63 and 64, which are comparatively small in diameter, the plastic material is exposed to a greater heated surface area. Furthermore, in order to divide the material flow through four parallel passages of even smaller size to further multiply the thermal effect upon the thermoplastic material, a pair of thermally conductive elongated divider strips 73 and 74 are installed longitudinally through the middle of each of the corresponding bores 63 and 64. The strips 73 and 74 are provided with transverse inlet openings 75 and 76, respectively, and transverse discharge openings 77 and 78, respectively. Inlet openings 75 and 76 are in alignment with the inlet port 58 so that the fluid plastic entering the inlet port 58 is simultaneously divided into four flow paths. When the fluid plastic has reached the opposite ends of the bores 63 and 64, all four flow paths merge into the single discharge bore 65. Each of the divided strips 73 and 74 are preferably made of the same thermal-conductive material as the block 60, such as aluminum, and in thermal communication with the block so that heat is simultaneously transferred through the divider strips 73 and 74 as well as the entire wall surface of the bores 63 and 64.

Mounted in the intermediate melting chamber 16 is a thermostat 80, or other type of thermo-responsive switch, designed to close below a predetermined threshold melting temperature within the chamber 16 to maintain the heating element 30 energized. A second thermostat, or thermo-responsive electrical switch, 81 is mounted in the melting receptacle 15 and also adapted to be closed below another predetermined melting temperature in order to energize the heating elements 43. Mounted on the hopper 17 is a third thermostat 82 also adapted to close a switch as long as the temperature within the hopper 17 remains below a certain predetermined value.

A fourth thermostat or thermally responsive electric switch 83 is mounted in the dispensing head 60 in order to maintain the thermal elements 70 energized below another predetermined dispensing temperature.

As best disclosed in FIG. 9, the electrical control circuit 85 includes power leads 86, main power switch 87 and a line indicator light 88, if desired, connected across the input line 89 and the common or return line 90. The input line 89 is connected through the remote manual switch 91 to the magnetic clutch circuit 92 including resistor 93, diode rectifier 94 and the coil 49' of magnetic clutch 49, in series. Capacitor 95 is connected across the coil 49'. Optionally connected in parallel with the magnetic clutch circuit 92 and in series with the remote switch 91 is a pilot light 96.

Input line 89 is also connected to melting control line 98 including thermostatic switch 82. Branching off from the melting control line 98 into two parallel circuits are intermediate melting circuit 99 and melting receptacle circuit 100. The intermediate circuit 99 includes the intermediate thermostatic switch 80 and the heating elements 30 connected in parallel with each other and also with the intermediate pilot light 101. In a similar manner, the melting receptacle circuit 100 includes in series the thermostatic switch 81 and the heating elements 43 connected in parallel with each other and with their pilot light 102.

The input line 89 is also connected to the dispenser control circuit 104 including in series its thermostatic switch 83 and the two heater elements 70 in parallel with each other and with their pilot light 105.

The power switch 87 and the pilot lights 101, 102, 88 and 105 may be mounted on a control panel 107 containing some of the electrical components for operating the apparatus. The control panel 107 is in turn mounted upon a removable housing 108, which may encase most of the operating parts of the apparatus 10, as best disclosed in FIGS. 1, 2, 3 and 4.

In describing the operation of the apparatus 10, it will be assumed that a thermoplastic adhesive material, such as polyethylene, in small solid pellet form will be processed by the apparatus 10 for dispensing through the nozzle 68 in a hot, liquid state. The polyethylene pellets 110 (FIG. 3) introduced into the supply chamber 18 will gravitate through the hopper section or pre-melt chamber 17 into the intermediate melting chamber 16 where the lowermost pellets will rest in the V-shaped pockets 27. The supply chamber 18 is filled preferably to a level substantially above the sight openings 20. It is possible, of course, to eliminate the supply chamber 18 if the side walls of the hopper 17 are high enough to contain an adequate supply of pellets for the particular job.

The nozzle head 68 is positioned for its intended operation and the motor 54 is turned on, or the driven shaft 50 is otherwise suitably connected to a conventional source of power, such as the drive shaft of a packaging machine with which the apparatus 10 is adapted to cooperate.

For a polyethylene material, the thermostat 82 is set to open when the temperature in the pre-melt chamber 17 has attained a value of approximately 160–200° F., since polyethylene begins to attain its fluid state at approximately 200° F. The thermostatic switch 80 is set to open when the temperature of the material within the intermediate melting chamber 16 is approximately 250° F. The thermostatic switch 81 is set to open when the material in the melting receptacle 15 is approximately 350° F., and the thermostatic switch 83 is set to open when the temperature of the plastic material within the dispensing head 60 is approximately 380–400° F.

The melting cycle is initiated by closing the power switch 87. Since the initial temperatures in the various thermostatically controlled chambers are substantially less than the threshold temperatures of the thermostats at a cold start, all of the thermostatic switches 82, 80, 81 and 83 will be closed, and all of the heating elements 30, 43 and 70 will be energized. Solid particles of polyethylene 110 in contact with the undulating surface defined by the interior of the walls 24 and the surfaces of the ribs 26 will melt first. As these portions of the polyethylene melt, heat will be transferred to other solid portions so that the polyethylene particles gradually melt from the bottom upwardly.

If for any reason, the melting polyethylene in the intermediate chamber 16 should exceed a threshold temperature of approximately 250° F., the thermostatic switch 80 will open to de-energize the heating elements 30. On the other hand, if the temperature of the fluid plastic within the intermediate chamber 16 remains below the threshold temperature of 250° F., yet the temperature of the semi-solid thermoplastic material in the hopper 17 adjacent the thermostat 82 should exceed the threshold temperature of, for example, 200° F. adjacent the thermostat 82, the thermostatic switch 82 will open to de-energize the heater elements 30, even though the thermostatic switch 80 remains closed. In this manner, there is a double check on the temperature of the fluid thermoplastic material in the intermediate chamber 16 and the hopper 17. This is important because it is imperative that all of the solid thermoplastic material 110 should not be melted, but there should always be a sufficient amount of thermoplastic solid particles to completely cover the upper surface of molten plastic to prevent oxidation and charring.

As the thermoplastic material in the recesses 27 becomes more fluid, it will flow downwardly through the passages 28 into the melting receptacle 15 where the fluid material will be further heated as it gradually fills receptacle 15. Here again, if the temperature of the fluid material in the receptacle 15 exceeds the threshold temperature of its thermostat 81, then the thermostatic switch 81 will automatically open to de-energize the heating elements 43. The fluid material in the melting receptacle 15 is also subject to this same double check as the intermediate chamber 16, since when the threshold temperature of the thermostat 82 is exceeded, the thermostatic switch 82 will open to de-energize both sets of heating elements 30 and 43 even though the respective thermostatic switches 80 and 81 remain closed.

The continuously melting thermoplastic material gradually moves downwardly through the chamber 16 and receptacle 15, through the discharge opening 34, inlet conduit 44 and into the input port 45 of the pump chamber 46.

By closing the remote switch 91 the electromagnetic clutch 49 is energized to couple the rotating driven shaft 50 to the pump shaft 48 and start the rotary gear pump 47. The hot plastic fluid is then pumped from its intake port 45 around the pump gears and out through the discharge port 55, outlet conduit 56, fluid coupling 57 and dispenser head inlet 58, where the fluid material divides into four paths and passes on opposite sides of the heated divider strips 73 and 74 in each of the heated bores 63 and 64, and then out through the discharge bore 65, discharge fitting 67, heated discharge hose 66 and nozzle 68. Although not disclosed in the drawings, there is usually a solenoid valve associated with the nozzle head 68 which is connected in the circuit 85 to simultaneously open when the switch 91 is closed so that hot fluid is discharged from the nozzle head 68 as it is being pumped through the apparatus 10.

Whenever the temperature within the dispensing head 60 exceeds the threshold temperature of the corresponding thermostat 83, the thermostatic switch 83 will automatically open to de-energize the heating element 70.

After the plastic application job has been completed and the switches 91 and 87 opened, the plastic material will gradually cool in all of the respective chambers 17, 16, 15, 12 and 60. However, the amounts of solid thermoplastic material in each of the respective chambers is so small, and the heat transfer surface is so large, that upon re-starting, the material in each of the successive chambers will be simultaneously heated and very quickly melted by the corresponding heater elements 30, 43 and 70. In this manner, hot liquid thermoplastic material is almost immediately available for discharge from the dispenser head 60.

It should be noted, particularly in FIG. 3, that the pump chamber 46 is located remotely from the dispensing head 60 in fact, the pump chamber 46 is located upon the opposite side of the conduit block 12 from the dispensing head 60. In this manner, the high temperature required in the dispensing head 60, which is even higher than the temperatures required in the melting stages of the chambers 17, 16 and 15, will not affect the bearings of the pump shaft 48, which sometimes are deleteriously sensitive to the excessive heat, and particularly for sustained periods of time.

It will be noted that the partition walls 26 are disposed transversely of the intermediate melting chamber 16, while the ribs 35 are disposed longitudinally of the melting receptacle, or in other words perpendicular to the partition walls 26. Since the thermoplastic material in the intermediate chamber 16 is merely to be transferred straight down without any horizontal flow, the partition walls 26 are arranged transversely in order to attain the maximum heat transfer surface for smaller pockets of thermoplastic material. For example, if the partition wall 26 extended longitudinally, each thermoplastic material pocket 27 would extend the longest dimension of the intermediate chamber 16, whereas as disclosed in the drawings, it extends through the shorter transverse dimension. Moreover, by having the partition walls 26 extend transversely, shorter heating element rods 30 may be employed than if the rods had to extend the full length of the intermediate chamber 16.

On the other hand, the flow of thermoplastic material in the melting receptacle 15 must not only be downward, but must flow horizontally toward the middle of the receptacle 15 in order to be discharged through the discharge opening 34, and this entire flow, both downwardly and laterally toward the center must be unobstructed. If the ribs 35 were extended transversely and the passages 36 were extended longitudinally, the material would have to flow through longer paths because they must first flow transversely toward the middle and then longitudinally toward the center, whereas as constructed in accordance with the invention, the horizontal flow is only from the ends toward the middle.

The rotary gear pump 47 is employed because of its simplicity, its positive displacement of the fluid plastic, because of its easy maintenance and replacement of parts, and because it can move thermoplastic materials having a wide range of viscosities.

In actual experiments with models built in accordance with the invention, it has been possible to attain hot thermoplastic material, specifically polyethylene, at the desired discharge temperature, from a cold start in approximately 15 minutes. Commercial apparatus now available for accomplishing the same purposes, namely, the heated pots or tanks, require much longer times to warm up to operating temperatures from cold starts.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. An apparatus for melting and dispensing thermoplastic material comprising:
   (a) a melting receptacle having a continuous side wall, a bottom wall, and an open top for receiving said material,
   (b) a discharge opening through said bottom wall,
   (c) said bottom wall having a heating surface exposed to thermoplastic material within said receptacle,
   (d) means for heating said heating surface,
   (e) a hopper forming an upper extension of said receptacle side wall and in fluid communication with the open top of said receptacle,
   (f) a thermal-sensing element mounted on said hopper,
   (g) means operably connecting said thermal-sensing element to said surface heating means to maintain an interface between the solid portion and the molten portion of said material at an approximate predetermined level in said hopper,
   (h) a dispensing head having a dispensing chamber, an inlet and an outlet,
   (i) dispenser heating means for heating said dispensing chamber,
   (j) a pump,
   (k) means connecting said pump in fluid communication between said discharge opening and said dispensing head inlet, and
   (l) means for driving said pump.

2. The invention according to claim 1 in which said heating surface is an undulating upper surface of said bottom wall.

3. The invention according to claim 2 in which said undulating surface comprises a plurality of horizontally spaced, upwardly projecting ribs of high thermal conductivity, all the spaces between said ribs being in fluid communication with said discharge opening, said means for heating said undulating surface comprising at least one heating element in said bottom wall in thermal-conductive communication with said ribs.

4. The invention according to claim 1 further comprising an intermediate melting chamber between said melting receptacle and said hopper, said intermediate chamber having a continuous side wall coextensive with the side wall of said receptacle and said hopper, a plurality of horizontally spaced, thermally-conductive partitions in said intermediate chamber, means for heating said partitions, and a passage between at least one pair of adjacent partitions in fluid communication with said melting receptacle.

5. The invention according to claim 4 in which said heating surface comprises a plurality of transversely spaced, upwardly projecting, thermally-conductive, parallel ribs, the spaces between said ribs being in fluid communication with said discharge opening, said partitions in said intermediate chamber being spaced longitudinally of each other and above and normal to said ribs.

6. The invention according to claim 5 in which each of said ribs and each of said partitions has opposite side surfaces diverging downwardly.

7. The invention according to claim 5 in which said ribs extend longitudinally inwardly from the opposite ends of said receptacle and terminate on opposite sides of said discharge opening to form transverse passages communicating the spaces between said ribs with said discharge opening.

8. The invention according to claim 7 further comprising a reticulated shield fixed horizontally above said transverse passages in said melting receptacle, the openings through said shield permitting the free passage of very fluent thermoplastic material, but preventing the passage of the more viscous and solid material.

9. The invention according to claim 4 in which said thermal-sensing element comprises a hopper thermostat, an intermediate thermostat in said intermediate melting chamber, a receptacle thermostat in said melting receptacle, said intermediate thermostat being operatively connected to said partition heating means, and said receptacle thermostat being operatively connected to said bottom surface heating means, said intermediate thermostat being connected electrically in parallel with said receptacle thermostat, and said hopper thermostat being connected in series with each of said intermediate and receptacle thermostats.

10. The invention according to claim 9 in which said hopper thermostat is adapted to be actuated by the approximate melting temperature of the material at a predetermined level in said hopper, said intermediate thermostat being adapted to be actuated at an intermediate temperature higher than said melting temperature, and said receptacle thermostat being adapted to be actuated at a receptacle temperature higher than said intermediate temperature.

11. The invention according to claim 10 further comprising a dispenser thermostat in said dispensing chamber adapted to actuate said dispenscer heating means when said dispenser thermostat senses a temperature higher than said receptacle temperature.

12. The invention according to claim 1 in which said dispensing head comprises a solid block of thermal-conductive material and said dispensing chamber comprises a bore extending through said block communicating said inlet and said outlet, a flat elongated partition wall extending longitudinally through said bore having transverse apertures therethrough at opposite ends and being made of the same thermal-conductive material as said block.

References Cited
UNITED STATES PATENTS 2,809,772 10/1957 Weisz.
3,377,466 4/1968 Paulsen _____ 222—146

SAMUEL F. COLEMAN, Primary Examiner